(12) United States Patent
Damiani et al.

(10) Patent No.: US 8,047,608 B2
(45) Date of Patent: Nov. 1, 2011

(54) METHOD FOR IMPLEMENTING A SUPPORTING BASE OF A CAR SEAT FOR CHILDREN, BASE AND CAR SEAT THUS OBTAINED

(75) Inventors: Osvaldo Damiani, Curno (IT); Gianluca Merli, Malnate (IT)

(73) Assignee: Artsana S.p.A., Grandate (CO) (IT)

( * ) Notice: Subject to any disclaimer, the term of this patent is extended or adjusted under 35 U.S.C. 154(b) by 154 days.

(21) Appl. No.: 12/559,686

(22) Filed: Sep. 15, 2009

(65) Prior Publication Data

US 2010/0066141 A1 Mar. 18, 2010

(30) Foreign Application Priority Data

Sep. 17, 2008 (IT) .............. MI2008A1654

(51) Int. Cl.
*A47D 1/10* (2006.01)
*A47C 4/00* (2006.01)
(52) U.S. Cl. ........... 297/256.16; 297/42; 297/233; 297/250.1; 297/350; 297/351; 297/440.1
(58) Field of Classification Search .......... 297/42, 297/233, 250.1, 256.16, 350, 351, 440.1
See application file for complete search history.

(56) References Cited

U.S. PATENT DOCUMENTS

| | | | | | |
|---|---|---|---|---|---|
| 371,091 | A | * | 10/1887 | Miller | 297/351 X |
| 843,780 | A | * | 2/1907 | Wheatley | 5/17 |
| 954,594 | A | * | 4/1910 | Shaw | 297/233 |
| 966,891 | A | * | 8/1910 | Dudley | 297/350 X |
| 1,318,569 | A | * | 10/1919 | Kramer | 5/12.1 |
| 2,699,202 | A | * | 1/1955 | Leary et al. | 297/233 X |
| 2,800,947 | A | * | 7/1957 | Thiem | 297/383 |
| 3,637,253 | A | * | 1/1972 | Maule et al. | 296/65.11 |
| 3,743,351 | A | * | 7/1973 | Harris | 297/233 X |
| 3,759,572 | A | * | 9/1973 | Koepke | 297/351 X |
| 4,493,285 | A | * | 1/1985 | Williams | 297/350 X |
| 4,765,678 | A | * | 8/1988 | Huang | 297/236 |
| 4,824,171 | A | * | 4/1989 | Hollingsworth | 297/351 |

(Continued)

FOREIGN PATENT DOCUMENTS

EP 111184 A2 * 6/1984 ............ 297/351

(Continued)

OTHER PUBLICATIONS

European Search Report dated Sep. 29, 2009 (5 pages).

*Primary Examiner* — Rodney B White
(74) *Attorney, Agent, or Firm* — Cozen O'Connor

(57) ABSTRACT

A method for implementing a supporting base (1) of a car seat, the latter including said base apt to rest onto a seat of such vehicle and apt to support an upper structure (16) apt to receive and retain a child, the base comprising a first (2) and a second (3) portion, the first sitting portion (2) being apt to rest onto the seat sitting and the second backrest portion (3) being apt to rest onto the backrest of such seat. It is provided to implement such base in at least two sections (20, 21), each section (20, 21) comprising a portion of the base portion and a portion of the sitting portion of the base, said sections being then coupled therebetween and constrained so as to implement the above-mentioned base. The so-obtained base and the seat equipped with such base are also claimed.

12 Claims, 6 Drawing Sheets

U.S. PATENT DOCUMENTS

| | | | |
|---|---|---|---|
| 5,516,194 A * | 5/1996 | Maule | 297/284.1 |
| 5,564,786 A * | 10/1996 | Peek et al. | 297/452.4 |
| 5,660,436 A * | 8/1997 | Wilson | 297/233 |
| 6,352,307 B1 * | 3/2002 | Engman | 297/284.11 |
| 6,824,220 B1 * | 11/2004 | Davison | 297/233 X |
| 6,913,318 B2 * | 7/2005 | Higley et al. | 297/383 |
| 2004/0239164 A1 | 12/2004 | Vits et al. | |

FOREIGN PATENT DOCUMENTS

| | | |
|---|---|---|
| EP | 1493614 | 1/2005 |
| EP | 1728675 | 12/2006 |

* cited by examiner

METHOD FOR IMPLEMENTING A SUPPORTING BASE OF A CAR SEAT FOR CHILDREN, BASE AND CAR SEAT THUS OBTAINED

The object of the present invention is a method for implementing a supporting base of a car seat for children, according to the preamble of the corresponding independent claim.

The so-obtained base and the seat equipped with such base are also claimed, according to the corresponding claims.

Car seats are known including a base suitable to rest and to be constrained to a car seat (by means of a usual belt associated to the latter) and apt to support an upper structure suitable to directly contain the child, the latter being equipped with usual belt members retaining the child. Usually, the structure is mobile with respect to the base and it allows to place the child in at least two positions, one thereof allows him/her to sleep.

Usually, such base comprises a first portion or sitting portion, apt to be rested onto the car seat sitting, and a second portion or backrest portion, apt to be rested against the backrest of such seat.

The known bases are currently obtained with constructive methodologies leading to a relatively high cost of the same, which reflects onto the whole cost of the entire seat.

The object of the present invention is to offer a method for obtaining a base for a car child seat allowing to implement such base in a quick way, with a low number of pieces, which can be easily coupled therebetween, this leading to have a manufactured article with low costs with respect to the currently known bases for seats.

These and other objects which will be evident to the person skilled in the art are achieved by a method for obtaining a base for car child seat according to the enclosed corresponding claims. These objects are also achieved by a base obtained with such method and a car seat for children according to the corresponding claims.

For a better understanding of the present invention the following drawings are enclosed by way of simple example, but not for limitative purposes, wherein.

Figure 1:
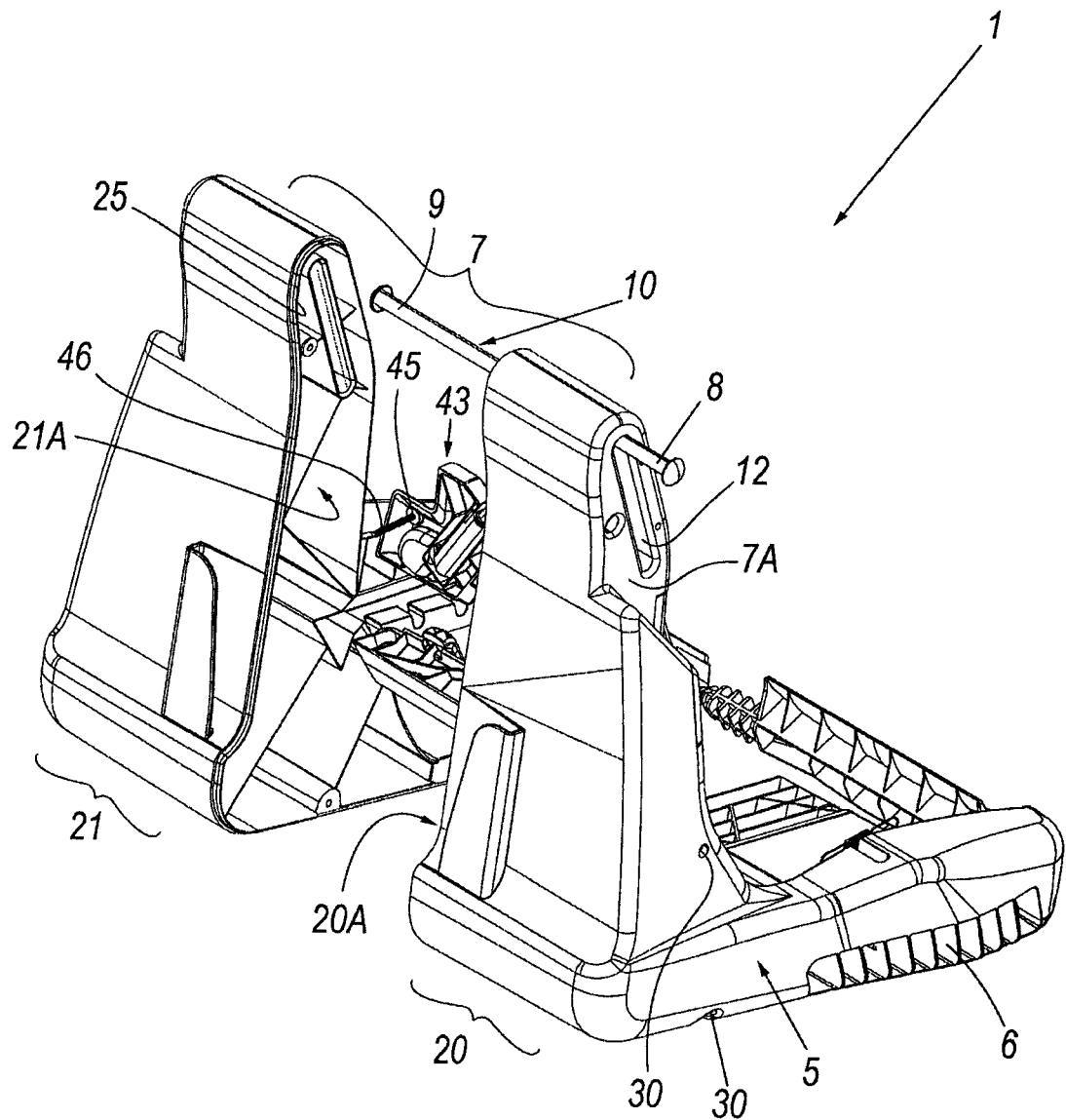
FIG. 1 shows a perspective view from the back of a base for car seat for children during a phase of its assembly.
Figure 2:
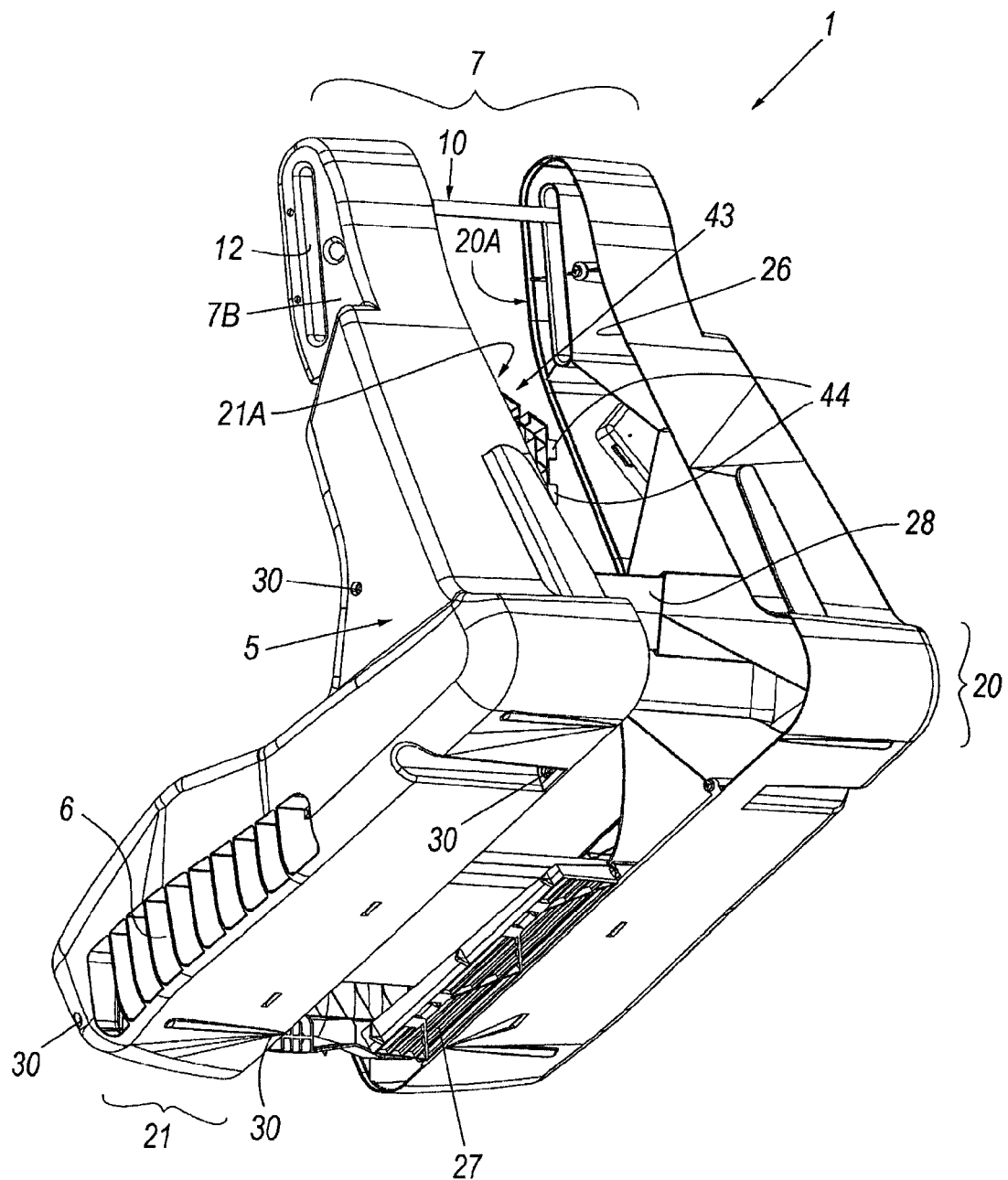
FIG. 2 shows a perspective view from the bottom of the base of FIG. 1 in the assembly phase shown in the latter.
Figure 3:
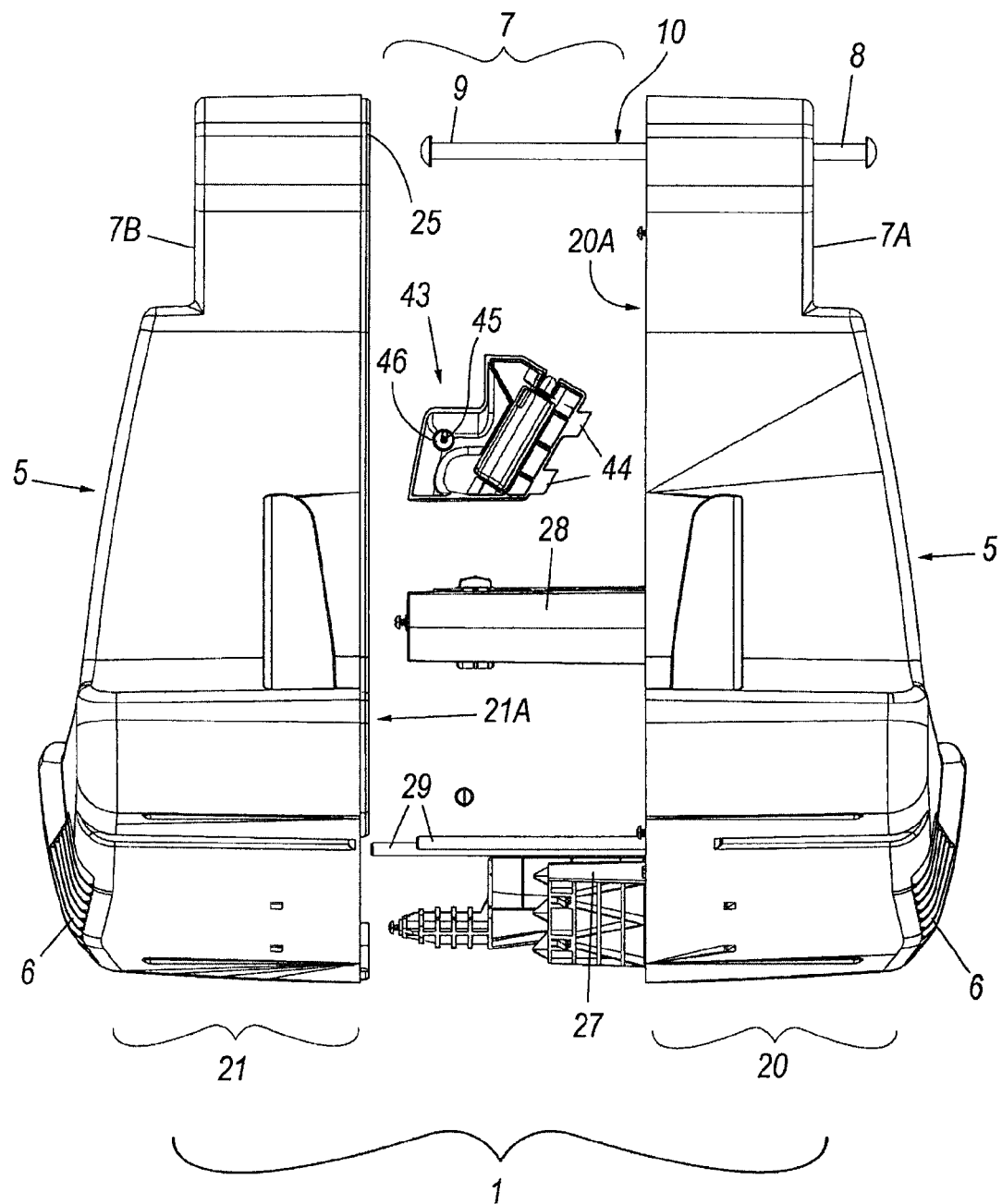
FIG. 3 shows a view from the back of the base of the above figures during the assembly phase shown in the latter.
Figure 4:
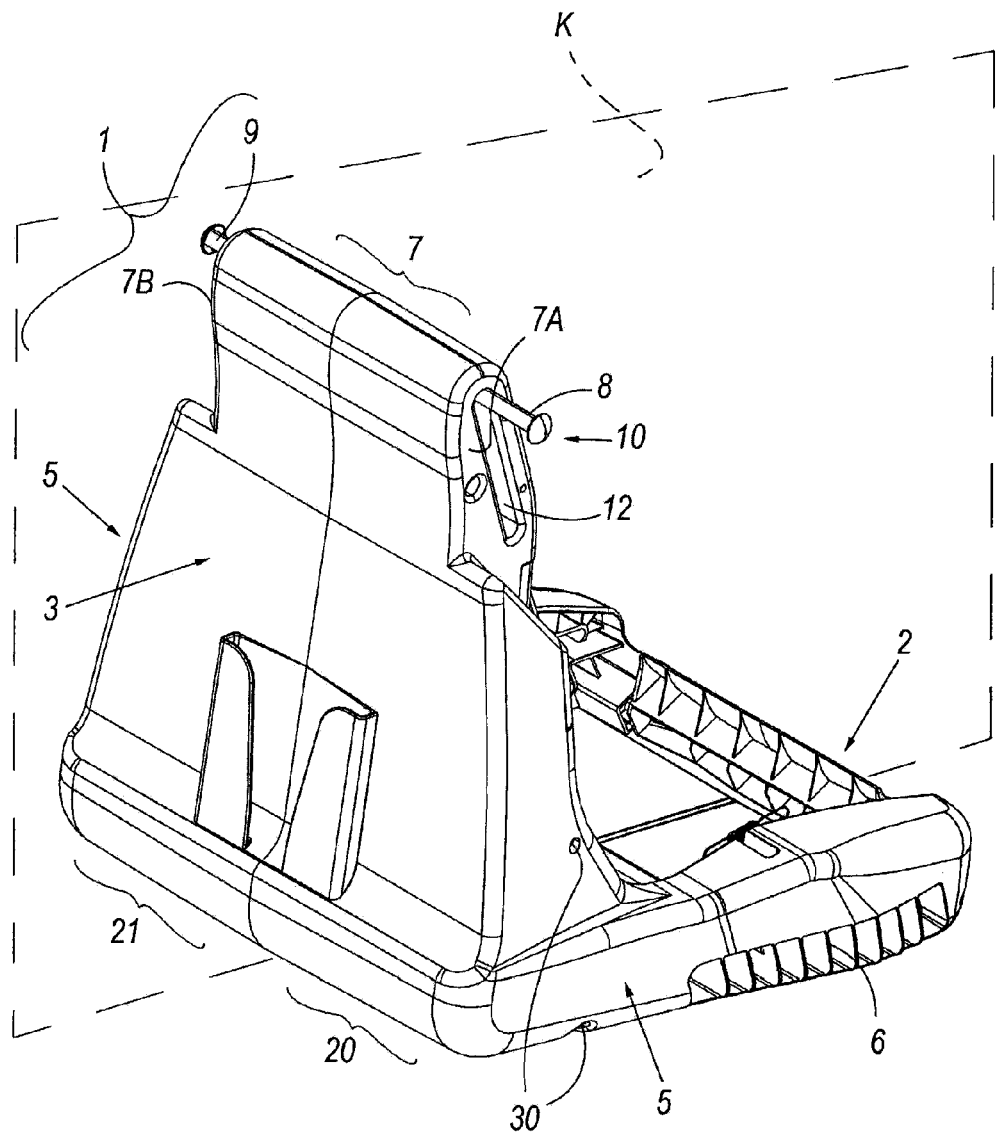
FIG. 4 shows a perspective view from the back of the assembled base of FIG. 1.
Figure 5:
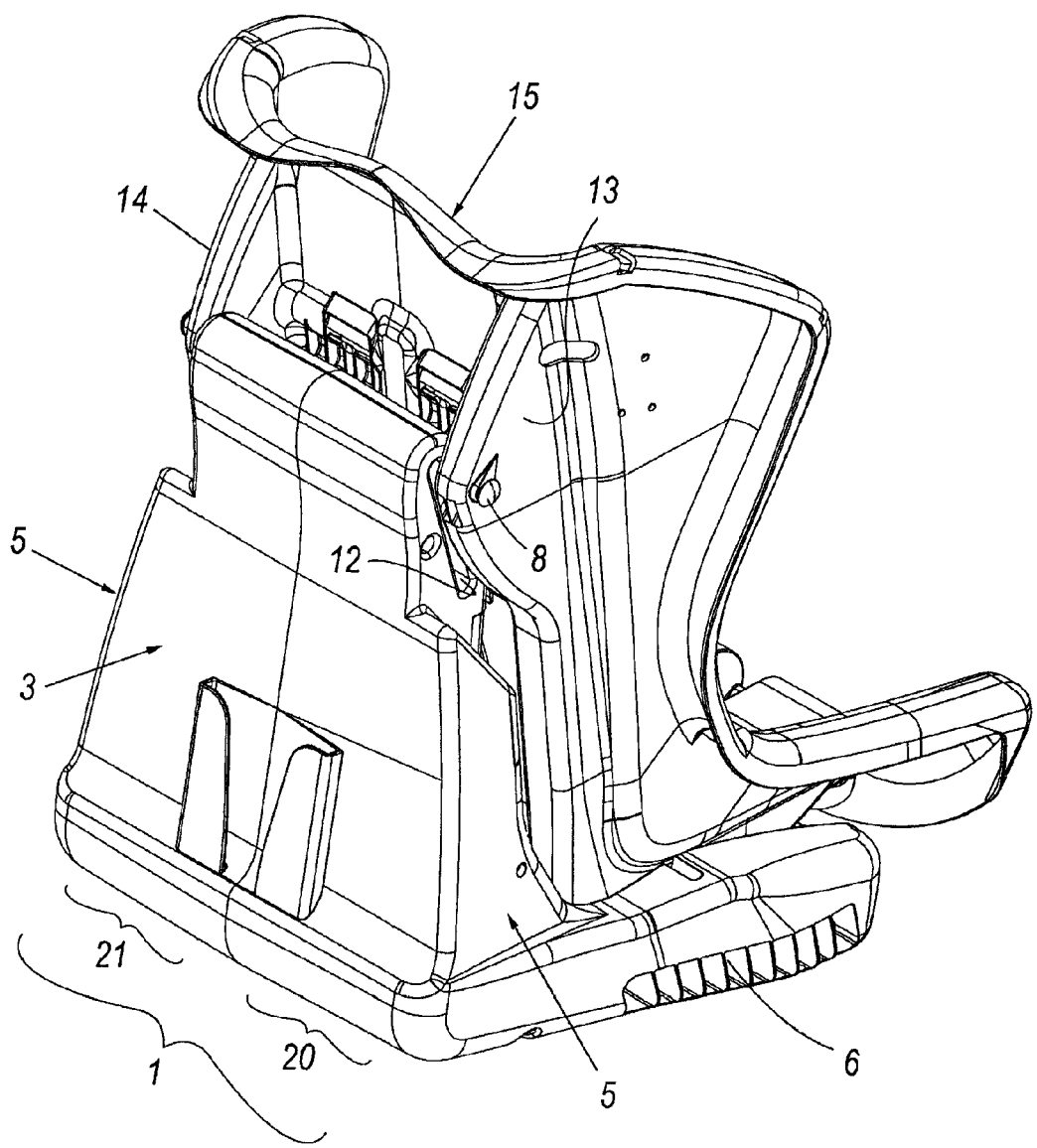
FIG. 5 shows a perspective view from the back of a first assembly phase of a car seat for children having a base obtained according to the invention.
Figure 6:
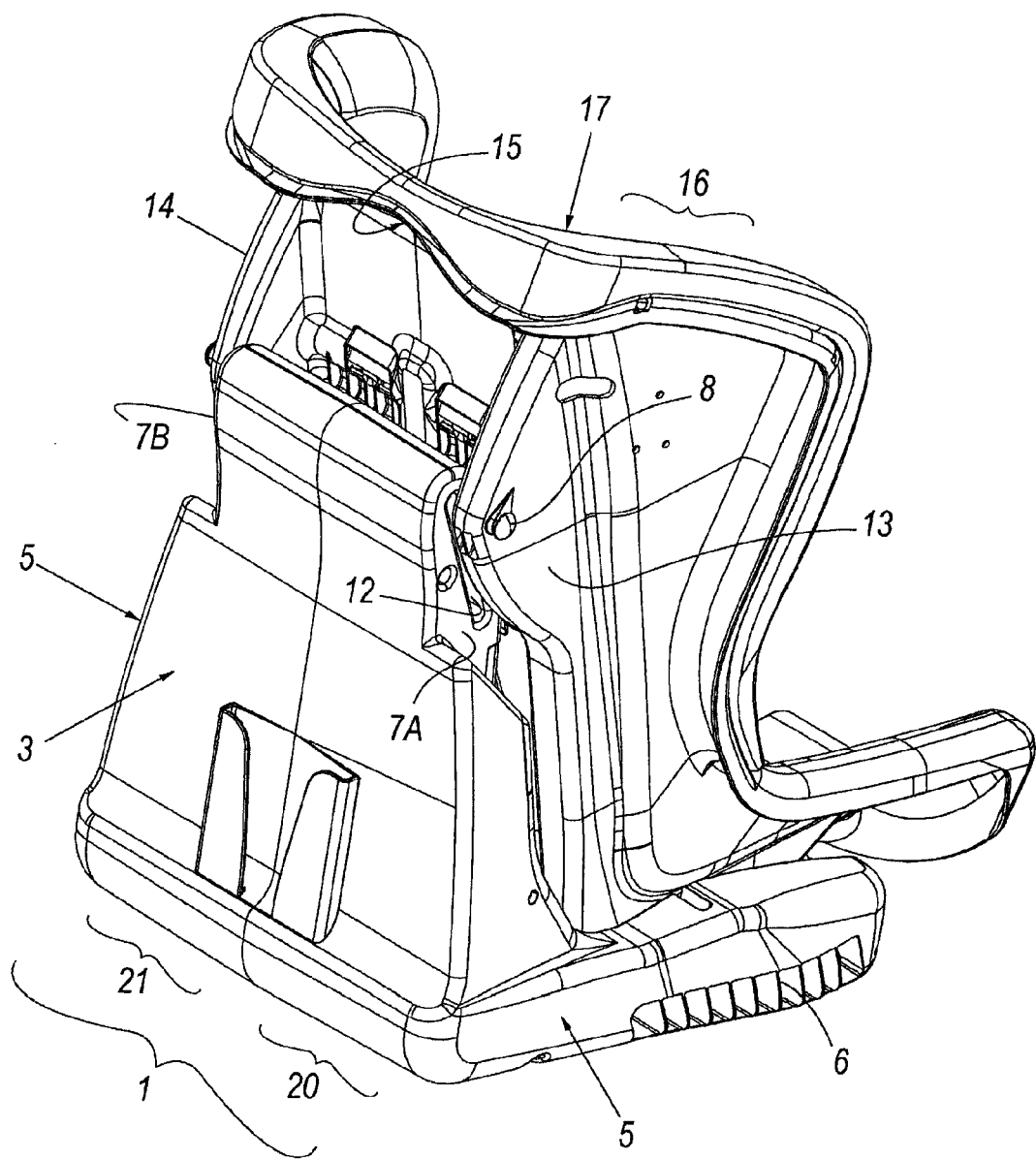
FIG. 6 shows a perspective view analogous to that of FIG. 5, but of another additional assembly phase of the car seat for children shown in such figure.

By referring to the mentioned figures, a base of a car seat for children comprises a body 1 having a first portion or sitting portion 2, apt to be placed on the sitting of a seat of the above-mentioned vehicle, and a second portion or backrest portion 3, apt to rest against the backrest of such seat. Said body 1 further comprises opposite side flanks 5 having lightening recesses 6, an upper portion 7 from the flanks thereof 7A, 7B ends 8, 9 of a cross pin 10, sliding within tilted guides 12 implemented within such flanks 7A, 7B, protrude, said ends 8 and 9 being apt to be constrained to flanks 13 and 14 of a first body 15 of a structure 16, apt to be overlapped to the base, thereupon a second body 17 is mounted. Such upper structure 16 is apt to contain a child (and to retain him/her by means of usual, not shown retaining members) and it is mobile along the base with the motion of the pin 10 within the guides 12.

According to the invention, the base body 1 comprises two sections 20 and 21 (on the inside hollow and stiffened by means of inner ribs), each one equipped with a portion of the sitting portion 2 and a portion of the backrest portion 3 of the base. Each section 20 and 21 further comprises one of the side flanks 5 of such base and one of the flanks 7A, 7B of the upper portion 7 of the latter.

Moreover, the first section 20 has a second flank 20A apt to couple with an angled second flank 21A of the other section 21. Such coupling is a shape coupling, in the sense that the flank 20A of the first section 20 couples, by following the shape, with the flank 21A of the second section 21. Preferably, the latter comprises a peripheral recess 25 apt to receive a projection 26 of the flank 20A of the first section so as to facilitate and guide the coupling between the sections 20 and 21.

Furthermore, at least from the flank 20A of the first section coupling members 27, 28 and 29 project, apt to be received in corresponding seats provided in the flank 21A of the second section so as to guide the coupling between the latter. Such coupling members are implemented as a single piece with the corresponding section and advantageously have particular shapes (for example with rectangular, polygonal or circular section) apt to simplify and guarantee the correct and single coupling with the respective seats. Thanks to such solution, the base of the car seat according to the invention is implemented by means of mechanical coupling of two sections 20, 21 having shapes so as to reproduce each one a portion of the base itself. Such sections are obtained by moulding of plastic material with moulds with limited sizes with respect to that of moulds which currently allow to implement the bases for car seats available on the market.

The flanks 20A, 21A of the sections apt to couple therebetween, which result to be inside the portion of the backrest 3 with the assembled body 1, can have a lying position at least parallel to a mid-plane K of the seat base (and of the portions 2, 3 thereof), but they could have also a tilted lying position with respect to said plane K (obviously provided that such flanks allow a shape coupling therebetween). In each case, such sections 20, 21 are coupled at an area inside the portion 3 of the body 1.

After having obtained them, the sections 20 and 21 are coupled by bringing their flanks 20A and 21A in contact therebetween and by making the projection 26 and the members 27, 28, 29 to penetrate inside the recess 25 and the respective seats. Then, one proceeds with constraining the two sections therebetween by means of (not shown) screws inserted in seats 30 provided below said sections and on the sides thereof.

During the assembly, a member 43, apt to receive a belt of the vehicle seat, is also associated to the sections 20, 21, such member 43 having wings 44 apt to penetrate inside the inner seats and a section (in the example, that 20) and a seat 45 for a screw 46 constraining (from outside) to the other section (in the example, that 21). The member 43 is positioned, once the seat is assembled, between the base and the upper structure (16).

Once the base is assembled, the upper structure 16 is mounted thereon with modes known on themselves.

Thanks to the invention it is possible obtaining, with low costs and simpler modes than the ones currently used for implementing analogous products, a seat base apt to support an upper structure for containing a child. As a consequence, also a lower cost of the so-implemented seat is obtained.

An embodiment of the invention has been described. However, still other embodiments are possible in the light of such description and they are considered to fall within the scope of the following claims.

The invention claimed is:

1. A method for assembling a supporting base of a car seat,
    said supporting base suitable to rest on a seat of a vehicle and structured and arranged to support an upper structure (16) suitable to receive and retain a child,
    said supporting base comprising a body (1) having a first sitting portion (2) and a second backrest portion (3), said first sitting portion (2) being structured and arranged to rest on said seat of said vehicle and said second backrest portion (3) being structured and arranged to rest against a backrest of said seat of said vehicle,
    said supporting base having at least two sections (20, 21), each section (20, 21) comprising a portion of said sitting portion (2) and a portion of said backrest portion (3),
    said sections being then coupled therebetween and constrainedly joined so as to assemble said supporting base, and
    said sections being coupled at an area inside said backrest portion (3) of said body (1).

2. The method according to claim 1, whereby each section (20, 21) is assembled by molding in plastic material.

3. The method according to claim 1, whereby at least one of said sections (20, 21) has coupling means (26, 27, 28, 29) structured and arranged to guide a coupling of said at least one of said sections (20, 21) in at least a second of said sections (20, 21),
    said at least one of said sections (20, 21) having countermeans (26) for cooperating with said coupling means during the assembly of said body (1).

4. The method according to claim 3, whereby said sections (20, 21) comprise a first section and a second section,
    said first section having said coupling means (26, 27, 28, 29), comprising members projecting from said first section,
    said countermeans (26) comprising a projection, and
    said second section comprising a recess (25) structured and adapted to receive said projection, thereby guiding said coupling between said first and second sections during the assembly of said supporting base.

5. The method according to claim 1, whereby said sections (20, 21) comprise flanks (20A, 21A) having complementary shapes for shape coupling between sections (20, 21), and
    said sections (20, 21) further providing seats (30) for inserting fastening means for constraining said coupling of said sections (20, 21).

6. A supporting base for car child seat,
    said base comprising a body (1) having a first sitting portion (2) structured and arranged to rest onto a seat of a vehicle, and a second backrest portion (3) structured and arranged to rest against a backrest of said seat of said vehicle,
    said base supporting an upper structure (16) structured and arranged to receive and retain a child, whereby said body (1) comprises at least two sections (20, 21) contrainedly joined therebetween, each provided with a portion of the first sitting portion (2) and with a portion of said second backrest portion (3) of said body (1),
    said sections (20, 21) coupled at flanks (20A, 21A) located inside said backrest portion (3) of said body (1).

7. The supporting base according to claim 6, whereby said sections (20, 21) comprise a first section and a second section,
    said first section having projecting members (26, 27, 28, 29) structured and arranged to couple with said second section, and
    said projecting members preferably having a shape structured and arranged to allow shape coupling between said first section and said second section during the assembly of said supporting base.

8. The base according to claim 6, whereby each section (20, 21) has a flank (5) of said base body (1),
    said sections (20, 21) further comprising an upper portion (7),
    said upper portion (7) comprising flanks (7A, 7B),
    said flanks (7A, 7B) comprising a pin (10) having projecting ends (8, 9),
    said pin (10) joining said upper structure (16) to said base (1),
    said pin (10) being able to move in guides inclined within said flanks (7A, 7B).

9. The base according to claim 6, whereby said coupled flanks (20A, 21A) of said sections (20, 21) lie on a mid-plane (K) of said base body (1).

10. The base according to claim 6, whereby said coupled flanks (20A, 21A) of said sections (20, 21) lie on an inclined plane with respect to a mid-plane (K) of said base body (1).

11. The base according to claim 6, whereby a member (43) is structured and arranged to receive a belt of said vehicle seat,
    said member (43) is constrained to at least one of said sections (20, 21),
    said member (43) further being wholly integral to at least one of said sections (20, 21) and being suitable to be interposed between said base and said upper structure (16).

12. Car seat for children comprising a base and an upper structure (16) associated to said base,
    said base comprising a body (1) having a first sitting portion (2) and a second backrest portion (3),
    said sitting portion (1) structured and arranged, to rest on a seat of a vehicle,
    said backrest portion (2) structured and arranged to rest on a backrest of said seat of said vehicle,
    whereby said base comprises at least two sections (20, 21) constrained therebetween and each one provided with a portion of said first sitting portion (2) and with a portion of said second backrest portion (3) of said body (1),
    said sections being coupled at a flank (20A, 21A) which is located inside said backrest portion (3).

* * * * *